United States Patent
Bhat et al.

(10) Patent No.: US 10,873,360 B2
(45) Date of Patent: Dec. 22, 2020

(54) SELF-INTERFERENCE CANCELLATION SYSTEM AND METHOD

(71) Applicant: Intel Corporation, Santa Clara, CA (US)

(72) Inventors: Ritesh Bhat, Hillsboro, OR (US); Stefano Pellerano, Beaverton, OR (US); Brent Carlton, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 4 days.

(21) Appl. No.: 16/364,643

(22) Filed: Mar. 26, 2019

(65) Prior Publication Data

US 2020/0313716 A1  Oct. 1, 2020

(51) Int. Cl.
*H03D 1/04* (2006.01)
*H04B 1/525* (2015.01)
*H04B 15/00* (2006.01)
*H04L 5/14* (2006.01)

(52) U.S. Cl.
CPC ........... *H04B 1/525* (2013.01); *H04B 15/005* (2013.01); *H04L 5/1461* (2013.01)

(58) Field of Classification Search
CPC ...... H04B 1/525; H04B 15/005; H04B 15/00; H04B 1/0475; H04L 5/1461; H04L 5/14
USPC .... 375/285, 219, 296, 346, 222; 455/73, 84, 455/85, 86
See application file for complete search history.

(56) References Cited

U.S. PATENT DOCUMENTS

| | | | |
|---|---|---|---|
| 6,625,424 B1* | 9/2003 | Mohindra | H03C 3/40 455/84 |
| 10,663,541 B2* | 5/2020 | Babakhani | G01R 33/3607 |
| 2009/0017770 A1* | 1/2009 | Mirzaei | H04B 1/525 455/73 |

(Continued)

OTHER PUBLICATIONS

Zhou, Jin et al. "Integrated Wideband Self-Interference Cancellation in the RF Domain for FDD and Full-Duplex Wireless." IEEE Journal of Solid-State Circuits, vol. 50, No. 12, Dec. 2015. 17 pages.

(Continued)

*Primary Examiner* — Tesfaldet Bocure
(74) *Attorney, Agent, or Firm* — Viering, Jentschura & Partner MBB

(57) ABSTRACT

Systems, methods, and circuitries are disclosed for performing self-interference cancellation in a transceiver. In one example, a self-interference cancellation system includes a cancellation signal circuitry, cancellation circuitry, down-conversion circuitry, and an LO derivation circuitry. The cancellation signal circuitry is configured to use a cancellation transmit (TX) local oscillator (LO) signal to up-convert a baseband transmit leakage replica signal to generate a cancellation signal. The cancellation circuitry is configured to combine the cancellation signal with a received signal to generate a corrected received signal. The down-conversion circuitry is configured to use a receive (RX) LO signal to down-convert the corrected received signal to generate a baseband received signal. The LO derivation circuitry is configured to derive the cancellation TX LO signal and the RX LO signal from a common LO signal.

21 Claims, 5 Drawing Sheets

FIG. 3

(56) References Cited

U.S. PATENT DOCUMENTS

| | | | | |
|---|---|---|---|---|
| 2009/0213770 A1* | 8/2009 | Mu | ........................ | H04B 1/126 |
| | | | | 370/281 |
| 2013/0102254 A1* | 4/2013 | Cyzs | ...................... | H04B 1/525 |
| | | | | 455/63.1 |
| 2014/0194071 A1* | 7/2014 | Wyville | ................... | H04B 1/62 |
| | | | | 455/73 |
| 2014/0194073 A1* | 7/2014 | Wyville | ................ | H04L 43/028 |
| | | | | 455/73 |
| 2015/0333847 A1* | 11/2015 | Bharadia | ............... | H04L 5/1461 |
| | | | | 455/63.1 |

OTHER PUBLICATIONS

Ramakrishnan, Sameet et al. "An FD/FDD Transceiver with RX Band Thermal, Quantization, and Phase Noise Rejection and >64dB TX Signal Cancellation." 2017 IEEE Radio Frequency Integrated Circuits Symposium. 4 pages.

Wu, Hao et al. "A Blocker-Tolerant Inductor-Less Wideband Receiver With Phase and Thermal Noise Cancellation." IEEE Journal of Solid-State Circuits, vol. 50, No. 12, Dec. 2015. 17 pages.

\* cited by examiner

SELF-INTERFERENCE CANCELLATION SYSTEM AND METHOD

BACKGROUND

Frequency division duplexing (FDD) systems rely on stringent specifications in terms of transmit (TX)-receive (RX) isolation, TX noise and distortion in the RX band, and RX linearity. A major source of interference in FDD transmitters is self-interference that the receiver experiences from the transmitter.

BRIEF DESCRIPTION OF THE DRAWINGS

FIG. 3A illustrates an exemplary auxiliary LO signal generator of FIG. 3 in accordance with various aspects described.

DESCRIPTION

In FDD transceivers a duplexer is used to filter the transmitted signal from the received signal and the received signal from the transmitted signal. To enable separation of the transmitted signal from the received signal, the center frequency of the transmitted signal is offset from the received signal by a "duplex offset frequency." The level of isolation provided by the duplexer directly affects the quality of the transmitted signal and received signal. Transmitted signal that "leaks" through the duplexer causes "self-interference" in the transceiver and reduces the quality of the received signal. Self-interference cancellation in a transceiver is a technique that leverages the fact that the transmitted signal is available for use in cancelling the effects of transmitter signal leakage from the received signal.

Figure 1:
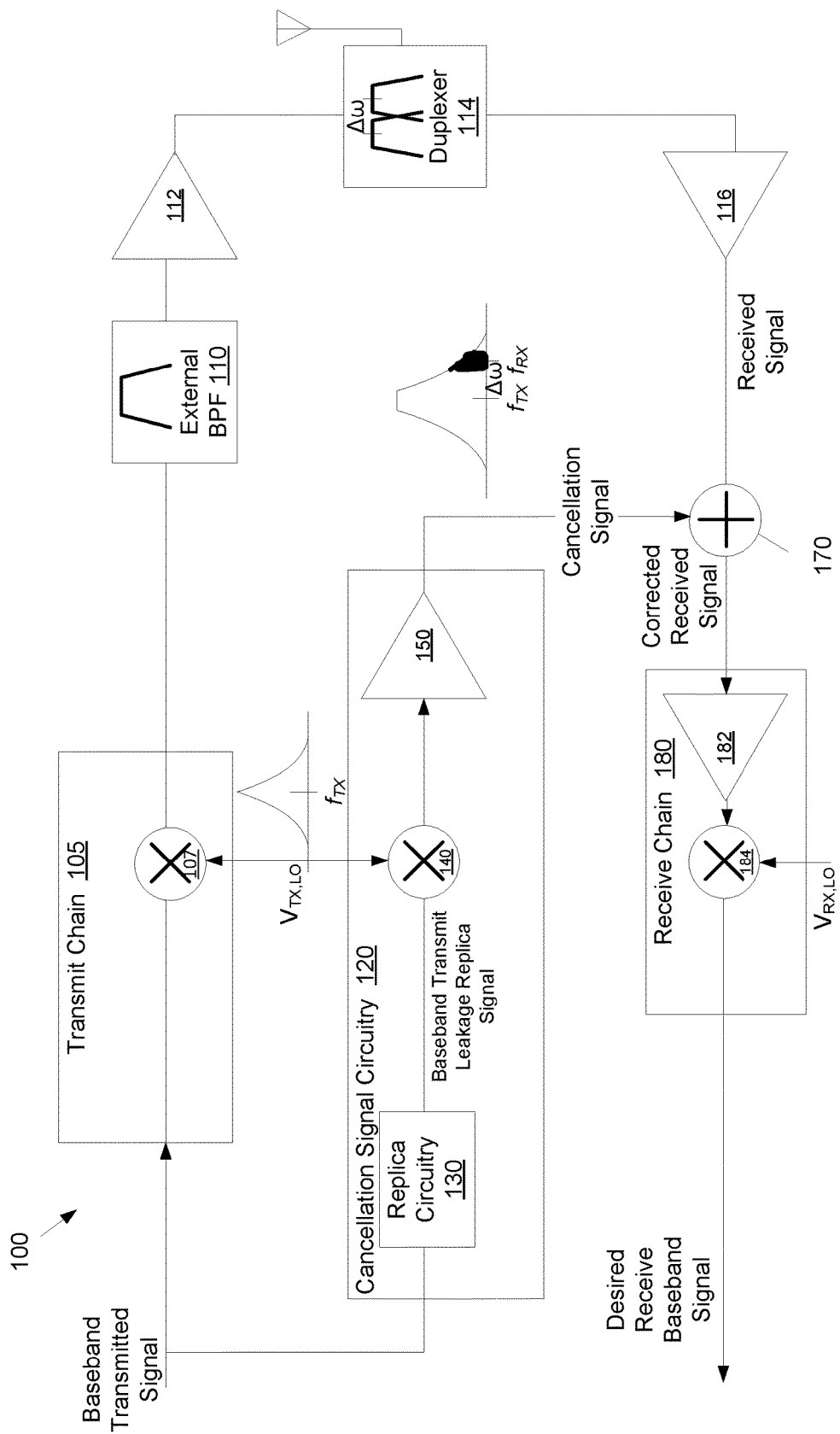
FIG. 1 illustrates an exemplary transceiver that includes a self-interference cancellation system that is susceptible to unwanted phase-noise mixing products in a cancellation signal.

FIG. 1 illustrates an exemplary transceiver system 100 that includes a transmit chain 105, cancellation signal circuitry 120, and a receive chain 180 that may be embodied on a system-on-chip (SoC). The transmit chain 105 includes an up-conversion mixer 107 that upconverts a baseband transmitted signal. Off-chip the transceiver 100 includes an external bandpass filter 110 and an external power amplifier (PA) 112 that process the transmitted signal, a low noise amplifier (LNA) 116 that processes the received signal, and a duplexer 114 that provides isolation between the transmitter and receiver.

The cancellation signal circuitry 120 includes replica circuitry 130 that generates a baseband transmit leakage replica signal (hereinafter "replica signal") by tapping and conditioning the baseband transmitted signal to match the leakage through the duplexer 114. The replica circuitry 130 mimics the leakage of the up-converted transmitted signal into the receive chain 180 that is allowed by the duplexer 114. A cancellation up-conversion mixer 140 up-converts the replica signal and amplifier 150 amplifies the up-converted replica signal to generate a cancellation signal. Cancellation circuitry 170 combines the cancellation signal with the received signal at an input of the receive chain 180 to cancel the estimated self-interference from the received signal to generate a "corrected" received signal from which self-interference has been cancelled.

The receive chain 180 includes a low noise amplifier (LNA) 182 and a down-conversion mixer 184 that down-converts the corrected received signal to generate a desired (or compensated) baseband received signal having reduced self-interference. In the transceiver 100 illustrated in FIG. 1, a TX LO signal is used by the cancellation up-conversion mixer 140 to up-convert the replica signal. Due to the phase-noise of the TX LO signal, the up-converted replica signal will include undesired phase-noise mixing products that lie in the RX band as shown in FIG. 1. These phase-noise mixing products are added to the received signal by cancellation circuitry 170, resulting in desensitization of the receive chain 180 which can be quite severe.

One way of reducing phase-noise mixing products in the cancellation signal is to use a very high quality TX LO signal with extremely low phase-noise to up-convert the replica signal. Generating a low phase-noise LO signal is quite challenging and power consuming, leading to increased power consumption and increased cost.

Described herein are systems, circuitries, and methods that use a common LO signal to derive the LO signal used to up-convert the replica signal and also the LO signal used to down-convert the corrected received signal. This will cause the LO signal used by the up-conversion mixer to have the same phase-noise as the LO signal used by the down-conversion mixer in the receive chain (except shifted by the duplex offset frequency). Additionally, the described systems, circuitries, and methods include an auxiliary path in the receive chain that is used to first shift the phase-noise mixing product in the corrected received signal by twice the duplex offset frequency in the frequency domain. The shifted phase-noise mixing product is then "flipped" and conjugated and added to the corrected received signal to effectively cancel the phase-noise mixing products from the received signal.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Figure 2:
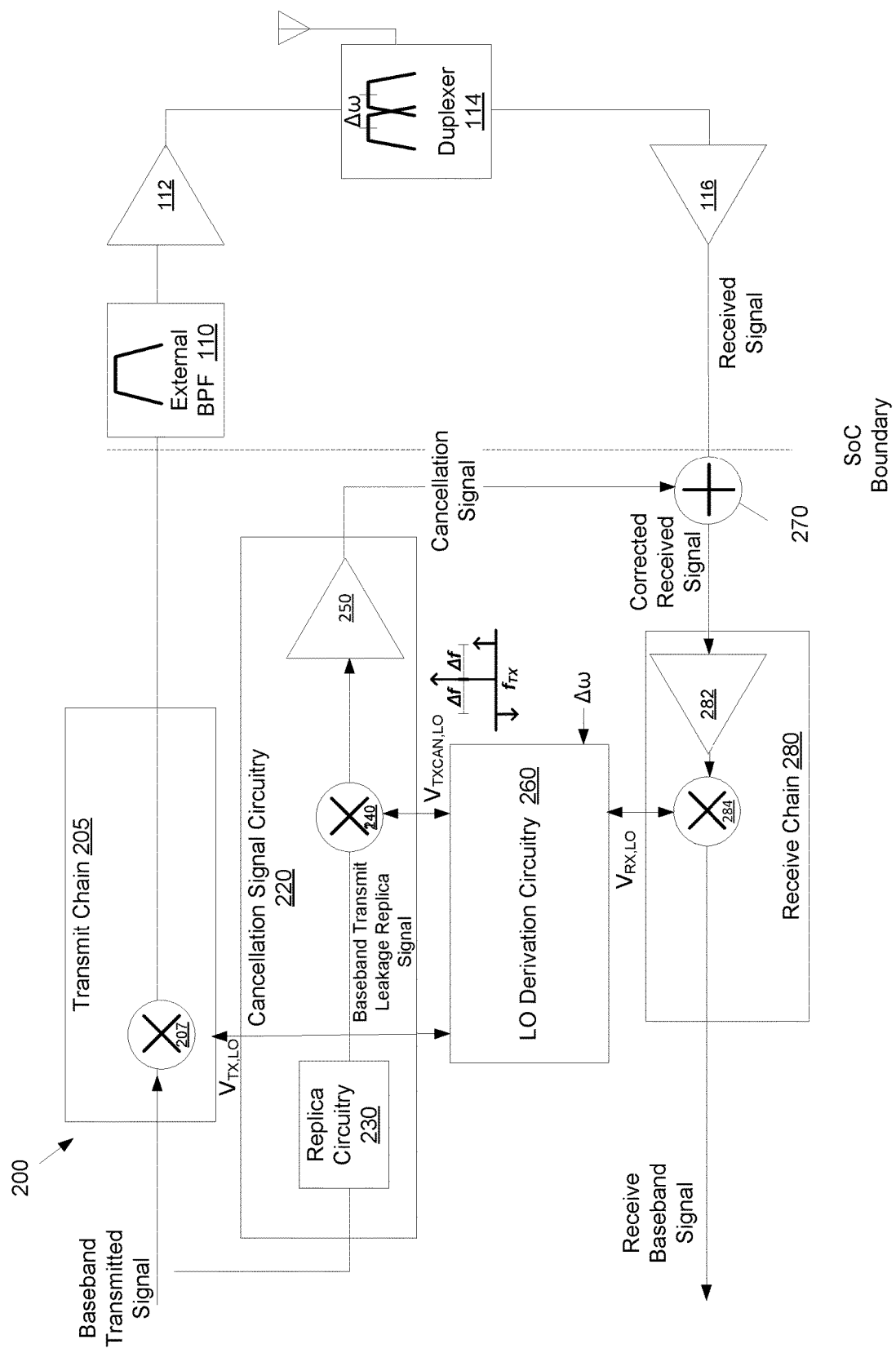
FIG. 2 illustrates an exemplary transceiver that includes common LO signal derivation for a cancellation signal and a received signal in accordance with various aspects described.

FIG. 2 illustrates an exemplary transceiver 200 that includes a self-interference cancellation system. As with the self-interference system of FIG. 1, cancellation signal circuitry 220 includes a replica circuitry 230 that generates a replica signal. A cancellation up-conversion mixer 240 uses a cancellation transmit (TX) local oscillator (LO) signal to up-convert the replica signal to generate the cancellation signal. Cancellation circuitry 270 is configured to combine the cancellation signal with a received signal to generate a corrected received signal. A down-mixer 284 uses a receive (RX) LO signal to down-convert the corrected received signal to generate a desired baseband received signal.

To ensure that the phase-noise mixing products in the cancellation signal are correlated to phase-noise mixing products in the down-converted corrected received signal, and therefore able to be more effectively cancelled, the self-interference cancellation system includes LO derivation circuitry 260. The LO derivation circuitry 260 is configured to derive the cancellation TX LO signal and the RX LO signal from a common LO signal. In the following description, the RX LO signal is the common LO signal and the LO derivation circuitry 260 is configured to derive the cancellation TX LO signal from the RX LO signal. One benefit to using the RX LO signal to derive the cancellation TX LO signal is that each receiver in a transceiver may have a "self-contained" self-interference cancellation system that uses the already available RX LO signal to derive the cancellation TX LO signal.

However, in another example, the cancellation TX LO signal is the common LO signal and the LO derivation circuitry is configured to derive the RX LO signal from the cancellation TX LO signal. In another example, the common LO signal is different from the cancellation TX LO signal and the RX LO signal. In this example the LO derivation circuitry is configured to derive the cancellation TX LO signal from the common LO signal and also to derive the RX LO signal from the common LO signal.

Figure 3:
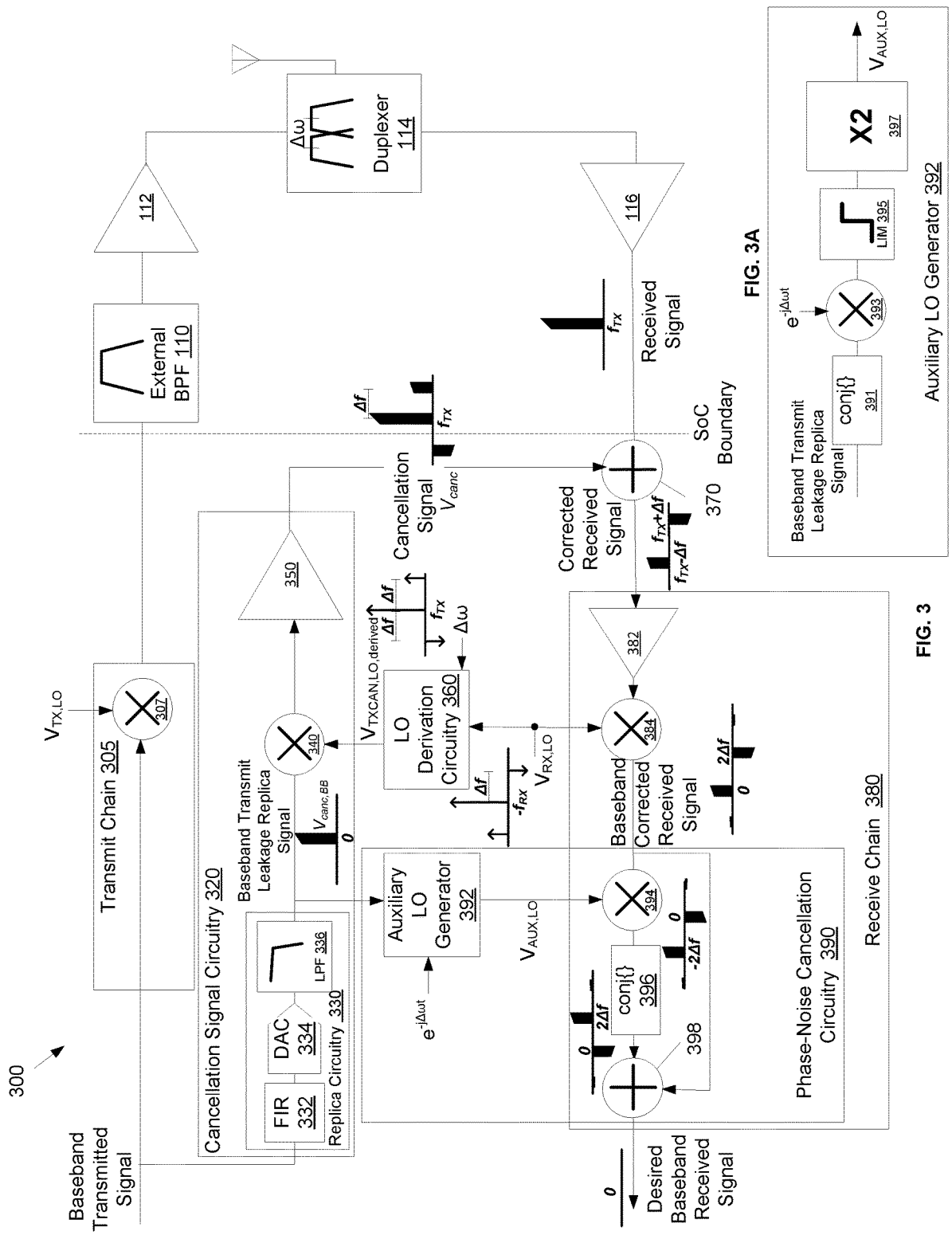
FIG. 3 illustrates an exemplary transceiver that includes common LO signal derivation for a cancellation signal and a received signal in accordance with various aspects described.

FIG. 3 illustrates an exemplary transceiver 300 that includes a self-interference cancellation system. FIG. 3 includes example power spectral densities for selected signals in the system. For simplicity sake the phase-noise of the RX LO signal is assumed to have a single spur at a distance equal to the duplex frequency offset. However, the described techniques work over a broad bandwidth and not just a spot frequency.

The transceiver 300 includes cancellation signal circuitry 320 that generates a cancellation signal. The cancellation signal circuitry 320 includes replica circuitry 330, cancellation up-conversion mixer 340, and amplifier 350. The replica circuitry 330 includes a finite impulse response (FIR) filter 332 that mimics, in the digital baseband domain, the filtering of the analog up-converted transmitted signal by the duplexer 114. This filtered baseband transmitted signal is converted to an analog signal by digital-to-analog converter (DAC) 334 and then filtered by low-pass filter 336 to generate the replica signal. A power spectral density of the replica signal is illustrated in FIG. 3. It can be seen that the replica signal has a single component centered around 0 Hz (baseband).

The replica signal is up-converted by the up-conversion mixer 340 using a cancellation TX LO signal that is derived from an RX LO signal associated with receive chain 380. The LO derivation circuitry 360 derives the cancellation TX LO signal from the RX LO signal based on the duplex offset frequency $\Delta\omega$. In one example, the LO derivation circuitry 360 is a digital-to-time converter (DTC). The input to the DTC is a ramp function with slope equal to the duplex offset frequency $\Delta\omega$. In another example, the LO derivation circuitry 360 is a mixer that phase-shifts the RX LO signal by the duplex offset frequency (by mixing with it with an LO signal at the duplex offset frequency ($e^{-j\Delta\omega t}$)).

In this manner, the phase-noise profile of the cancellation TX LO signal is substantially identical to the phase-noise profile of the RX LO signal but shifted by the duplex offset frequency. This ensures that the phase-noise mixing products are correlated with the phase-noise of the RX LO signal. In other words, the cancellation TX LO signal has the same phase-noise spectrum as that of the RX LO signal. The up-converted replica signal (i.e., the cancellation signal) includes phase-noise mixing products in addition to the replica signal component centered at the transmit frequency. These phase-noise mixing products are offset from the transmit signal by the duplex offset frequency $\Delta\omega$. One of these phase-noise mixing products lies in the receive band and should be cancelled.

The received signal includes a transmit signal leakage component centered at the transmit frequency. The cancellation signal is combined with the received signal by cancellation circuitry 370 (e.g., a circuit constructed of electronic components that performs and addition or subtraction operation on the cancellation signal and the received signal). In this manner the cancellation circuitry generates a corrected received signal that removes the estimated transmit signal leakage component from the received signal. While the corrected received signal does not contain the transmit signal leakage component, the phase-noise mixing products introduced by the up-conversion mixer 340 remain in the corrected received signal. After down-conversion, the baseband corrected received signal includes the phase-noise mixing products shifted by the duplex offset frequency so that the baseband corrected recieved signal includes a component around DC and another at twice the duplex offset frequency.

Phase-noise cancellation circuitry 390 is configured to cancel the phase-noise mixing products from the baseband corrected received signal. The phase-noise cancellation circuitry 390 leverages the fact that, because the LO signals used by the cancellation up-conversion mixer 340 and the down-conversion mixer 384 are derived from the same common LO signal (in this example the RX LO signal is the common LO signal), the phase-noise introduced into the down-converted corrected received signal will be correlated to the phase-noise in the cancellation signal.

The phase-noise cancellation circuitry 390 includes an auxiliary path that includes auxiliary mixer 394 and conjugation circuitry 396. The auxiliary mixer 394 uses auxiliary LO signal generated by an auxiliary LO generator 392 to shift the phase-noise mixing components in the baseband corrected received signal by twice the duplex offset frequency and "flip" the spectrum of the shifted signal in the frequency domain. The conjugation circuitry 396 processes the output of the auxiliary mixer 392 to ensure that the shifted and flipped phase-noise mixing products are in phase with the phase-noise mixing products in the baseband corrected received signal. Due to the inherent phase symmetry in any phase-modulated signal (and hence the phase-noise as well), the operation of the auxiliary path components creates a replica of the phase-noise mixing products in the baseband corrected received signal. Second cancellation circuitry 398 combines the replica of the phase-noise mixing products with the baseband corrected received signal to cancel the phase-noise mixing products from the baseband corrected received signal. This generates the desired baseband received signal from which the transmit signal leakage and phase-noise mixing products have been cancelled.

FIG. 3A illustrates an exemplary auxiliary LO generator 392. The auxiliary LO signal is essentially a phase modulated signal with a center frequency equal to twice the duplex offset frequency. The auxiliary LO signal may be expressed as:

$$v_{AUX\_LO}(t) = e^{-j(2\Delta\omega t + 2\Theta_D(t))} \quad \text{EQ. 1}$$

where $\Theta_D(t)$ is the phase modulation of the replica signal. The replica signal is conjugated by conjugation circuitry 391 and then auxiliary mixer 393 quadrature mixes the conjugated replica signal with an LO signal at the duplex offset frequency. The resulting signal is then passed through limiter 395 which extracts the phase component only. Finally, the phase component is passed through a frequency doubler 397 to obtain the desired auxiliary LO signal.

Figure 4:
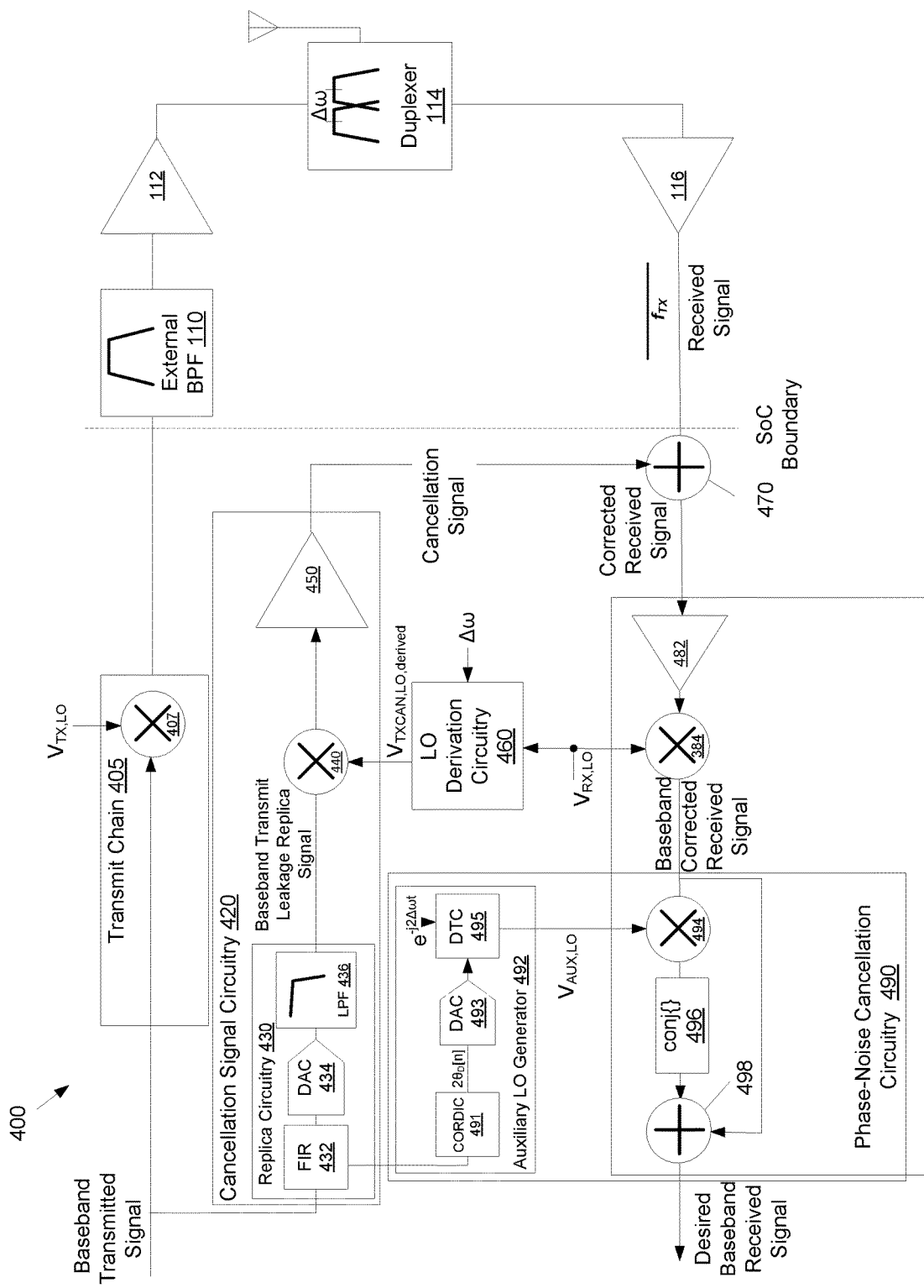
FIG. 4 illustrates an exemplary transceiver that includes common LO signal derivation for a cancellation signal and a received signal in accordance with various aspects described.

FIG. 4 illustrates an exemplary transceiver 400 that includes a self-interference cancellation system. The transceiver and self-interference cancellation system are similar to the transceiver 300 of FIG. 3 except that phase-noise cancellation circuitry 490 includes an alternative auxiliary LO generator 492. The alternative auxiliary LO generator 492 includes a coordinate rotation digital computer (CORDIC) 491 that extracts, in the digital domain, the phase modulation component of the baseband transmit leakage replica signal generated by a FIR filter 432. The digital phase modulation component is converted to an analog signal by DAC 493 and then provided to a DTC 495 (or mixer in other examples) that shifts the analog signal by twice the duplex offset frequency to generate the desired auxiliary LO signal.

Figure 5:
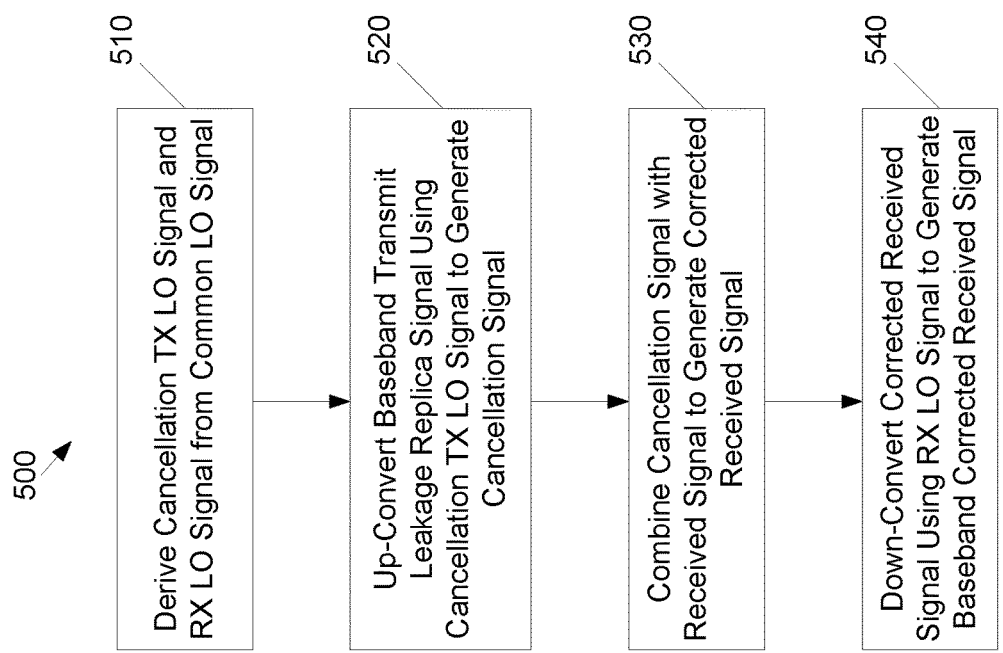
FIG. 5 illustrates an exemplary flow diagram of an exemplary method of cancelling self-interference in a transceiver in accordance with various aspects described.

FIG. 5 illustrates a flow diagram outlining an exemplary method 500 to cancel self-interference in a transceiver. The method includes, at 510, deriving a cancellation transmit (TX) local oscillator LO signal and a receive (RX) LO signal from a common LO signal. At 520 a baseband transmit leakage replica signal is up-converted using the cancellation TX LO signal to generate a cancellation signal. At 530, the cancellation signal is combined with a received signal to generate a corrected received signal. The method includes, at 540, down-converting the corrected received signal using the RX LO signal to generate a baseband corrected received signal.

In one example, the method 500 includes extracting the phase modulation of the baseband transmit leakage replica signal and up-converting the extracted phase modulation to twice the duplex offset frequency to generate a phase modulated auxiliary LO signal. The baseband received signal is down-converted with the auxiliary LO signal to generate a down-converted baseband received signal and the down-converted baseband received signal is processed to generate a conjugate signal. The method then includes combining the conjugate signal with the baseband received signal to generate a desired baseband received signal. These additional operations cancel out phase-noise mixing products in the corrected received signal.

It can be seen from the foregoing description that the self-interference cancellation systems, circuitries, and methods described herein effectively reduce RX desensitization due to LO phase-noise in the baseband cancellation signal circuitry. The TX leakage at the RX input is suppressed while the RX noise-figure degradation due to a noisy LO signal in the cancellation signal circuitry is also reduced.

Figure 6:
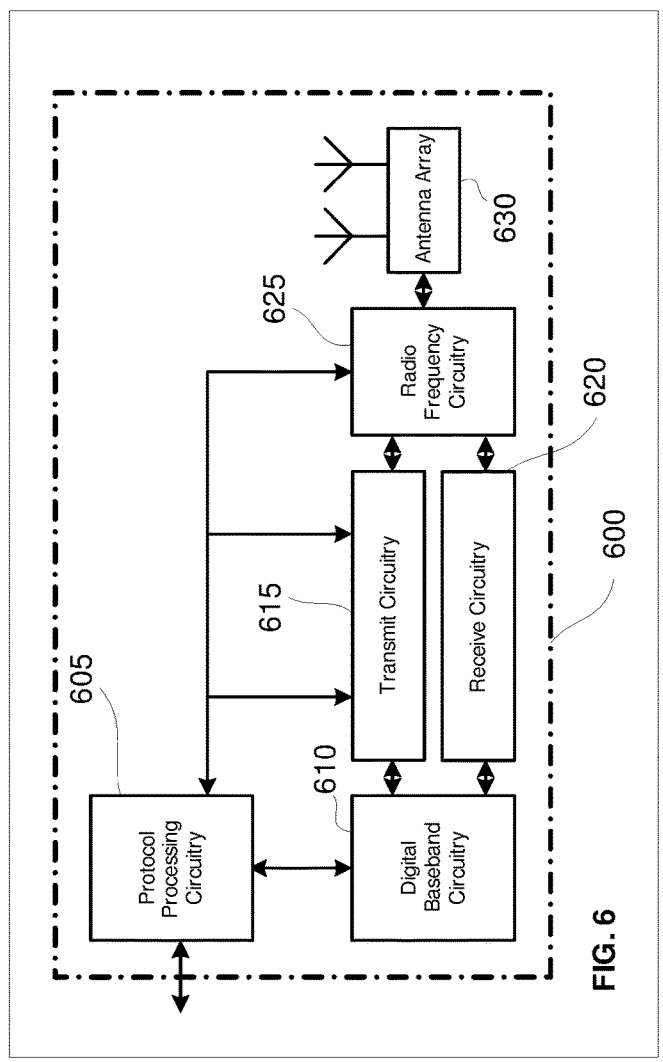
FIG. 6 illustrates an exemplary transceiver system in accordance with various aspects described.

FIG. 6 illustrates an exemplary millimeter wave communication circuitry 600 (e.g., transceiver) according to some aspects. Circuitry 600 is alternatively grouped according to functions. Components as shown in 600 are shown here for illustrative purposes and may include other components not shown here in FIG. 6.

Millimeter wave communication circuitry 600 may include protocol processing circuitry 605, which may implement one or more of medium access control (MAC), radio link control (RLC), packet data convergence protocol (PDCP), radio resource control (RRC) and non-access stratum (NAS) functions. Protocol processing circuitry 605 may include one or more processing cores (not shown) to execute instructions and one or more memory structures (not shown) to store program and data information.

Millimeter wave communication circuitry 600 may further include digital baseband circuitry 610, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 600 may further include transmit circuitry 615, receive circuitry 620 and/or antenna array circuitry 630. Millimeter wave communication circuitry 600 may further include radio frequency (RF) circuitry 625. In an aspect of the invention, RF circuitry 625 may include multiple parallel RF chains for one or more of transmit or receive functions, each connected to one or more antennas of the antenna array 630.

In an aspect of the disclosure, protocol processing circuitry 605 may include one or more instances of control circuitry (not shown) to provide control functions for one or more of digital baseband circuitry 610, transmit circuitry 615, receive circuitry 620, and/or radio frequency circuitry 625. Receive circuitry 620 may include self-interference cancellation systems or perform self-interference cancellation methods according to the examples described herein.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for cancelling self-interference in a transceiver according to embodiments and examples described herein.

Example 1 is a self-interference cancellation system, including a cancellation signal circuitry configured to use a cancellation transmit (TX) local oscillator (LO) signal to up-convert a baseband transmit leakage replica signal to generate a cancellation signal; cancellation circuitry configured to combine the cancellation signal with a received signal to generate a corrected received signal; a receive chain configured to use a receive (RX) LO signal to down-convert the corrected received signal to generate a baseband corrected received signal; and an LO derivation circuitry configured to derive the cancellation TX LO signal and the RX LO signal from a common LO signal.

Example 2 includes the subject matter of example 1, including or omitting optional elements, wherein the RX LO signal is the common LO signal and wherein the LO derivation circuitry is configured to derive the cancellation TX LO signal from the RX LO signal.

Example 3 includes the subject matter of example 1, including or omitting optional elements, wherein the cancellation TX LO signal is the common LO signal and wherein the LO derivation circuitry is configured to derive the RX LO signal from the cancellation TX LO signal.

Example 4 includes the subject matter of example 1, including or omitting optional elements, wherein the common LO signal is different from the cancellation TX LO signal and the RX LO signal and wherein the LO derivation circuitry is configured to derive the cancellation TX LO signal from the common LO signal and to derive the RX LO signal from the common LO signal.

Example 5 includes the subject matter of example 1, including or omitting optional elements, wherein the LO derivation circuitry includes a digital-to-time converter configured to convert the common LO signal to a derived LO signal based on a duplex offset frequency.

Example 6 includes the subject matter of example 1, including or omitting optional elements, wherein the LO derivation circuitry includes a mixer configured to convert the common LO signal to a derived LO signal based on a duplex offset frequency.

Example 7 includes the subject matter of example 1, including or omitting optional elements, further including phase-noise cancellation circuitry configured to cancel phase-noise mixing products from the baseband corrected received signal to generate a desired baseband received signal, the phase-noise cancellation circuitry including: an auxiliary LO generator configured to extract a phase modulation of the baseband transmit leakage replica signal and up-convert the extracted phase modulation to twice a duplex offset frequency to generate a phase modulated auxiliary LO signal; a mixer configured to down-convert the baseband received signal with the auxiliary LO signal to generate a down-converted baseband received signal; conjugation circuitry configured to process the down-converted baseband received signal to generate a conjugate signal; and second cancellation circuitry configured to combine the conjugate signal with the baseband received signal to generate the desired baseband received signal.

Example 8 is a method to cancel self-interference in a transceiver, the method including deriving a cancellation transmit (TX) local oscillator LO signal and a receive (RX) LO signal from a common LO signal; up-converting a baseband transmit leakage replica signal using the cancellation TX LO signal to generate a cancellation signal; combining the cancellation signal with a received signal to generate a corrected received signal; and down-converting the corrected received signal using the RX LO signal to generate a baseband corrected received signal.

Example 9 includes the subject matter of example 8, including or omitting optional elements, including deriving the cancellation TX LO signal from the RX LO signal.

Example 10 includes the subject matter of example 8, including or omitting optional elements, including deriving the RX LO signal from the cancellation TX LO signal.

Example 11 includes the subject matter of example 8, including or omitting optional elements, wherein the common LO signal is different from the cancellation TX LO signal and the RX LO signal and wherein the method further includes deriving the cancellation TX LO signal from the common LO signal and deriving the RX LO signal from the common LO signal.

Example 12 includes the subject matter of example 8, including or omitting optional elements, further including deriving a derived LO signal from the common LO signal using a digital-to-time converter that inputs a ramp function having a slope approximately equal to a duplex offset frequency.

Example 13 includes the subject matter of example 8, including or omitting optional elements, further including deriving a derived LO signal from the common LO signal using a mixer that shifts a frequency of the common LO signal by approximately a duplex offset frequency.

Example 14 includes the subject matter of example 8, including or omitting optional elements, further including extract a phase modulation of the baseband transmit leakage replica signal; up-convert the extracted phase modulation to twice a duplex offset frequency to generate a phase modulated auxiliary LO signal; down-converting the baseband received signal with the auxiliary LO signal to generate a down-converted baseband received signal; processing the down-converted baseband received signal to generate a conjugate signal; and combining the conjugate signal with the baseband received signal to generate a desired baseband received signal.

Example 15 is a transceiver, including a transmit chain configured to generate a transmitted signal from a baseband transmitted signal; a receive chain configured to generate a desired baseband received signal from a received signal; and a self-interference cancellation system. The self-interference cancellation system, includes replica circuitry configured to generate a baseband transmit leakage replica signal from the baseband transmitted signal; a cancellation signal circuitry configured to use a cancellation transmit (TX) local oscillator (LO) signal to up-convert the baseband transmit leakage replica signal to generate a cancellation signal; cancellation circuitry configured to combine the cancellation signal with the received signal to generate a corrected received signal wherein the receive chain includes a down-conversion mixer configured to use a receive (RX) LO signal to down-convert the corrected received signal to generate a baseband corrected received signal; and an LO derivation circuitry configured to derive the cancellation TX LO signal and the RX LO signal from a common LO signal.

Example 16 includes the subject matter of example 15, including or omitting optional elements, wherein the RX LO signal is the common LO signal and wherein the LO derivation circuitry is configured to derive the cancellation TX LO signal from the RX LO signal.

Example 17 includes the subject matter of example 15, including or omitting optional elements, wherein the cancellation TX LO signal is the common LO signal and wherein the LO derivation circuitry is configured to derive the RX LO signal from the cancellation TX LO signal.

Example 18 includes the subject matter of example 15, including or omitting optional elements, wherein the common LO signal is different from the cancellation TX LO signal and the RX LO signal and wherein the LO derivation circuitry is configured to derive the cancellation TX LO signal from the common LO signal and to derive the RX LO signal from the common LO signal.

Example 19 includes the subject matter of example 15, including or omitting optional elements, wherein the LO derivation circuitry includes a digital-to-time converter configured to convert the common LO signal to a derived LO signal based on a duplex offset frequency.

Example 20 includes the subject matter of example 15, including or omitting optional elements, wherein the LO derivation circuitry includes a mixer configured to convert the common LO signal to a derived LO signal based on a duplex offset frequency.

Example 21 includes the subject matter of example 15, including or omitting optional elements, further including phase-noise cancellation circuitry configured to cancel phase-noise mixing products from the baseband received signal to generate a desired baseband received signal. The phase-noise cancellation circuitry includes an auxiliary LO generator configured to extract a phase modulation of the baseband transmit leakage replica signal and up-convert the extracted phase modulation to twice a duplex offset frequency to generate a phase modulated auxiliary LO signal; a mixer configured to down-convert the baseband received signal with the auxiliary LO signal to generate a down-converted baseband received signal; conjugation circuitry configured to process the down-converted baseband received signal to generate a conjugate signal; and second cancellation circuitry configured to combine the conjugate signal with the baseband received signal to generate the desired baseband received signal.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

What is claimed is:

1. A self-interference cancellation system, comprising:
a cancellation signal circuitry configured to use a cancellation transmit (TX) local oscillator (LO) signal to up-convert a baseband transmit leakage replica signal to generate a cancellation signal;
a cancellation circuitry configured to combine the cancellation signal with a received signal to generate a corrected received signal;
a receive chain configured to use a receive (RX) LO signal to down-convert the corrected received signal to generate a baseband corrected received signal; and
an LO derivation circuitry configured to derive the cancellation TX LO signal and the RX LO signal from a common LO signal.

2. The self-interference cancellation system of claim 1, wherein the RX LO signal is the common LO signal and wherein the LO derivation circuitry is configured to derive the cancellation TX LO signal from the RX LO signal.

3. The self-interference cancellation system of claim 1, wherein the cancellation TX LO signal is the common LO signal and wherein the LO derivation circuitry is configured to derive the RX LO signal from the cancellation TX LO signal.

4. The self-interference cancellation system of claim 1, wherein the common LO signal is different from the cancellation TX LO signal and the RX LO signal and wherein the LO derivation circuitry is configured to derive the cancellation TX LO signal from the common LO signal and to derive the RX LO signal from the common LO signal.

5. The self-interference cancellation system of claim 1, wherein the LO derivation circuitry comprises a digital-to-time converter configured to convert the common LO signal to a derived LO signal based on a duplex offset frequency.

6. The self-interference cancellation system of claim 1, wherein the LO derivation circuitry comprises a mixer configured to convert the common LO signal to a derived LO signal based on a duplex offset frequency.

7. The self-interference cancellation system of claim 1, further comprising phase-noise cancellation circuitry configured to cancel phase-noise mixing products from the baseband corrected received signal to generate a desired baseband received signal, the phase-noise cancellation circuitry comprising:
an auxiliary LO generator configured to:
extract a phase modulation of the baseband transmit leakage replica signal; and
up-convert the extracted phase modulation to twice a duplex offset frequency to generate a phase modulated auxiliary LO signal;
a mixer configured to down-convert the baseband received signal with the auxiliary LO signal to generate a down-converted baseband received signal;
a conjugation circuitry configured to process the down-converted baseband received signal to generate a conjugate signal; and
a second cancellation circuitry configured to combine the conjugate signal with the baseband received signal to generate the desired baseband received signal.

8. A method to cancel self-interference in a transceiver, the method comprising:
deriving a cancellation transmit (TX) local oscillator LO signal and a receive (RX) LO signal from a common LO signal;
up-converting a baseband transmit leakage replica signal using the cancellation TX LO signal to generate a cancellation signal;
combining the cancellation signal with a received signal to generate a corrected received signal; and
down-converting the corrected received signal using the RX LO signal to generate a baseband corrected received signal.

9. The method of claim 8, comprising deriving the cancellation TX LO signal from the RX LO signal.

10. The method of claim 8, comprising deriving the RX LO signal from the cancellation TX LO signal.

11. The method of claim 8, wherein the common LO signal is different from the cancellation TX LO signal and the RX LO signal and wherein the method further comprises deriving the cancellation TX LO signal from the common LO signal and deriving the RX LO signal from the common LO signal.

12. The method of claim 8, further comprising deriving a derived LO signal from the common LO signal using a digital-to-time converter that inputs a ramp function having a slope approximately equal to a duplex offset frequency.

13. The method of claim 8, further comprising deriving a derived LO signal from the common LO signal using a mixer that shifts a frequency of the common LO signal by approximately a duplex offset frequency.

14. The method of claim 8, further comprising:
extracting a phase modulation of the baseband transmit leakage replica signal;
up-converting the extracted phase modulation to twice a duplex offset frequency to generate a phase modulated auxiliary LO signal;
down-converting the baseband received signal with the auxiliary LO signal to generate a down-converted baseband received signal;
processing the down-converted baseband received signal to generate a conjugate signal; and combining the conjugate signal with the baseband received signal to generate a desired baseband received signal.

15. A transceiver, comprising:
a transmit chain configured to generate a transmitted signal from a baseband transmitted signal;
a receive chain configured to generate a desired baseband received signal from a received signal; and
a self-interference cancellation system, comprising:
    a replica circuitry configured to generate a baseband transmit leakage replica signal from the baseband transmitted signal;
    a cancellation signal circuitry configured to use a cancellation transmit (TX) local oscillator (LO) signal to up-convert the baseband transmit leakage replica signal to generate a cancellation signal;
    a cancellation circuitry configured to combine the cancellation signal with the received signal to generate a corrected received signal wherein the receive chain comprises a down-conversion mixer configured to use a receive (RX) LO signal to down-convert the corrected received signal to generate a baseband corrected received signal; and
    an LO derivation circuitry configured to derive the cancellation TX LO signal and the RX LO signal from a common LO signal.

16. The transceiver of claim 15, wherein the RX LO signal is the common LO signal and wherein the LO derivation circuitry is configured to derive the cancellation TX LO signal from the RX LO signal.

17. The transceiver of claim 15, wherein the cancellation TX LO signal is the common LO signal and wherein the LO derivation circuitry is configured to derive the RX LO signal from the cancellation TX LO signal.

18. The transceiver of claim 15, wherein the common LO signal is different from the cancellation TX LO signal and the RX LO signal and wherein the LO derivation circuitry is configured to derive the cancellation TX LO signal from the common LO signal and to derive the RX LO signal from the common LO signal.

19. The transceiver of claim 15, wherein the LO derivation circuitry comprises a digital-to-time converter configured to convert the common LO signal to a derived LO signal based on a duplex offset frequency.

20. The transceiver of claim 15, wherein the LO derivation circuitry comprises a mixer configured to convert the common LO signal to a derived LO signal based on a duplex offset frequency.

21. The transceiver of claim 15, further comprising phase-noise cancellation circuitry configured to cancel phase-noise mixing products from the baseband received signal to generate a desired baseband received signal, the phase-noise cancellation circuitry comprising:
    an auxiliary LO generator configured to:
        extract a phase modulation of the baseband transmit leakage replica signal; and
        up-convert the extracted phase modulation to twice a duplex offset frequency to generate a phase modulated auxiliary LO signal;
    a mixer configured to down-convert the baseband received signal with the auxiliary LO signal to generate a down-converted baseband received signal;
    a conjugation circuitry configured to process the down-converted baseband received signal to generate a conjugate signal; and
    a second cancellation circuitry configured to combine the conjugate signal with the baseband received signal to generate the desired baseband received signal.

\* \* \* \* \*